Jan. 16, 1968   R. H. KRESS ET AL   3,363,916
HITCH FOR HEAVY DUTY HAULING VEHICLES
Filed Oct. 23, 1965   4 Sheets-Sheet 1
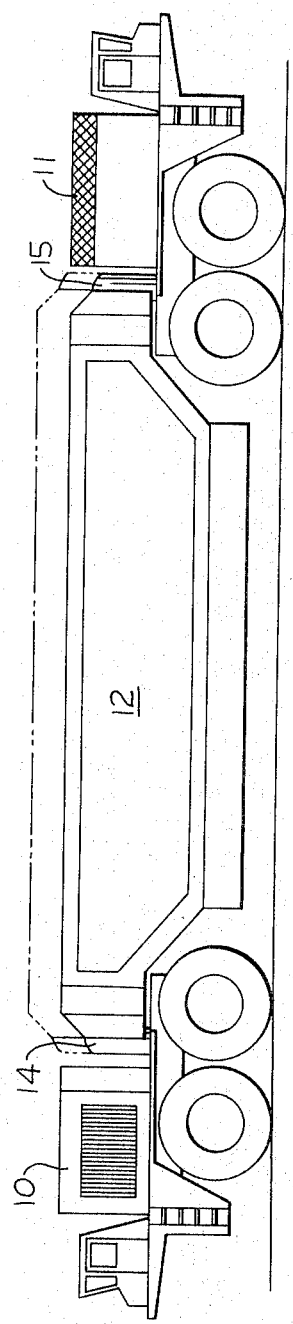
INVENTORS
RALPH H. KRESS
JACKSON C. MEDLEY
BY JAMES M. KOSTAS
ATTORNEYS

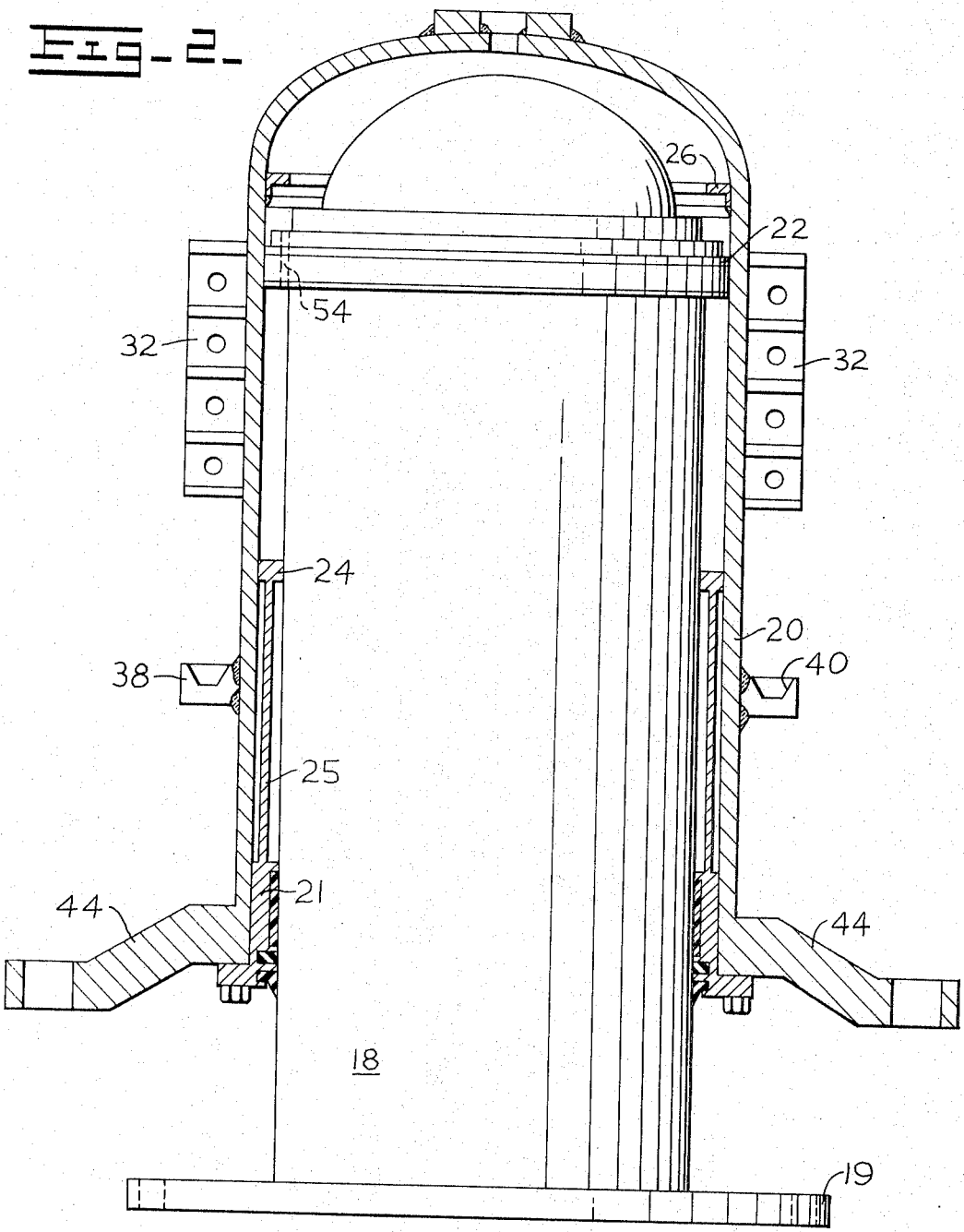

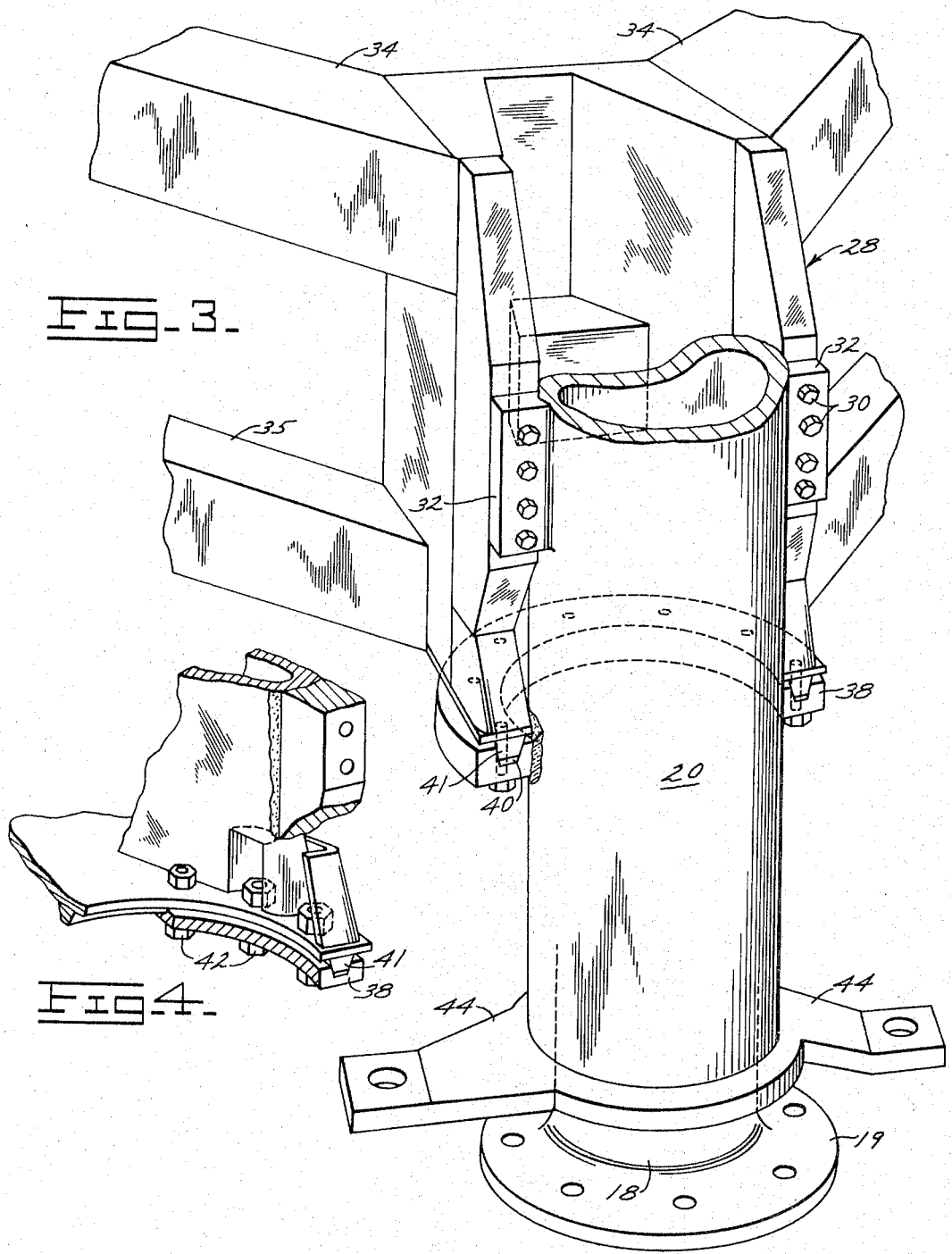

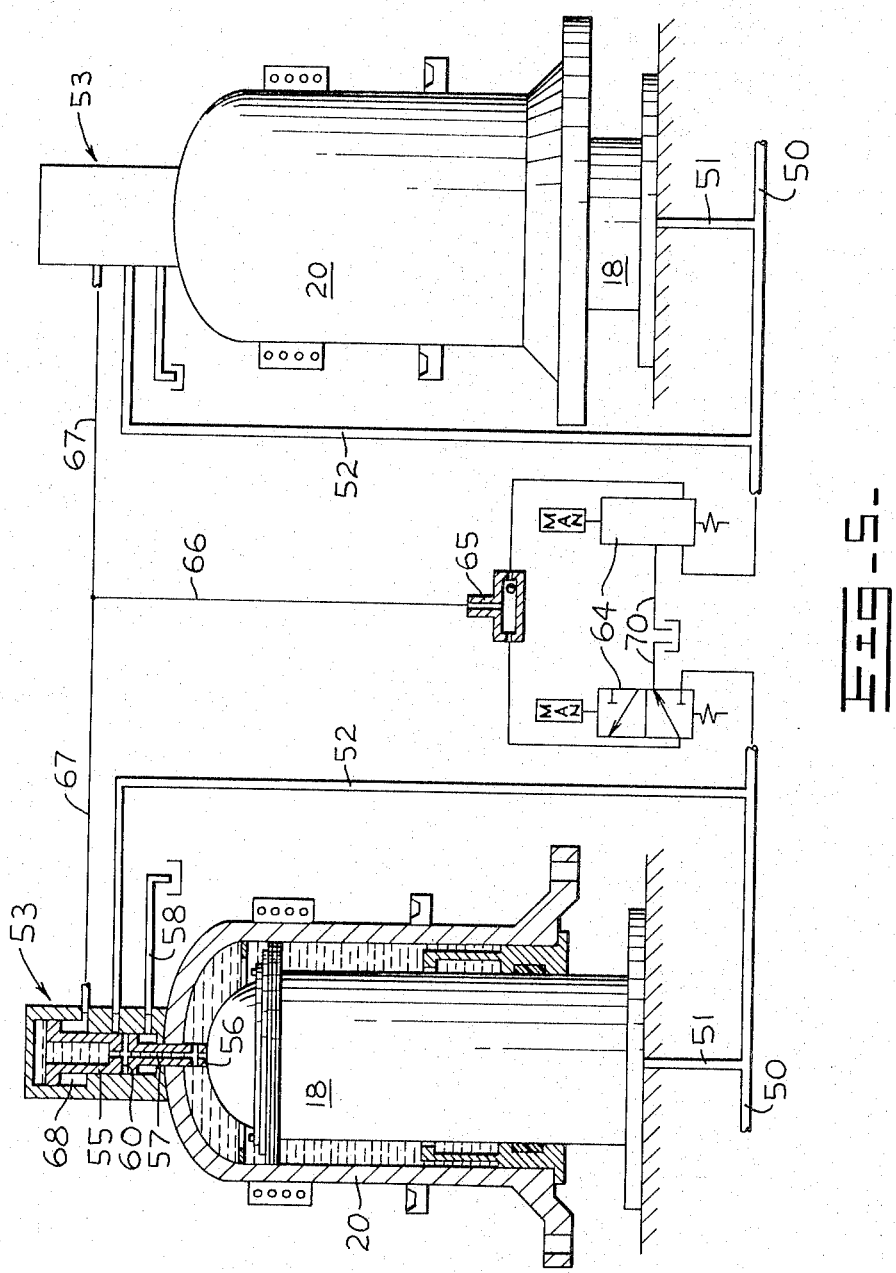

United States Patent Office 3,363,916
Patented Jan. 16, 1968

3,363,916
HITCH FOR HEAVY DUTY HAULING VEHICLES
Ralph H. Kress, Peoria, Jackson C. Medley, East Peoria, and James M. Kostas, Peoria, Ill., assignors to Caterpillar Tractor Co., Peoria, Ill., a corporation of California
Filed Oct. 23, 1965, Ser. No. 503,038
2 Claims. (Cl. 280—438)

ABSTRACT OF THE DISCLOSURE

A kingpin hitch for large capacity vehicles having a tractor and a body partially supported thereon in articulated fashion by interaction of a piston and cylinder of the hitch. An enclosed region between the piston and cylinder is filled with a noncompressible fluid to provide a fluid bearing for supporting the vehicle body. Valving is provided to replenish fluid lost from the hitch and to supply additional fluid therein for raising the truck body to increase its ground clearance.

---

Material handling vehicles exceeding 200 tons in capacity are now feasible and one such vehicle comprises two tractors articulately connected with and supporting opposite ends of a large body adapted to receive material to be hauled. It is to the articulate hitch of such a vehicle that the present invention pertains. Such a vehicle is disclosed in our assignee's copending application of Ralph H. Kress and Jackson C. Medley entitled, Suspension System for Heavy Vehicles, filed Sept. 21, 1965, Ser. No. 488,985, now Patent No. 3,330,578, and the present invention is disclosed but not claimed therein.

It is to the object of the invention to provide improvements in a hitch of the kingpin type to be used at each end of the vehicle body and comprising a large pin or piston on each tractor disposed vertically and extending into a cylinder on one end of the body. It is also an object of the invention to provide means for maintaining fluid under pressure between the cylinder and piston so that the weight of the body and its contents are supported substantially entirely on a liquid bearing. A further object is to provide means to increase the fluid pressure in the cylinder and thus raise the body for giving better ground clearance under certain operating conditions. Further and more specific objects of the invention and the manner in which they are carried into practice are made apparent in the following specification wherein reference is made to the accompanying drawings.

In the drawings:

FIG. 1 is a schematic view in side elevation of a hauling vehicle embodying the present invention.

FIG. 2 is a central vertical sectional view of a kingpin structure which articulately connects two tractors, one to each end of the material hauling component of the vehicle.

FIG. 3 is a perspective view with parts broken away and parts shown in section of the unit shown in FIG. 2 illustrating the manner of its connection to the hauling component.

FIG. 4 is a fragmentary detail showing a portion of the mechanism shown in FIG. 3 with parts broken away and parts in section, and FIG. 5 is a schematic view showing the fluid circuits connecting and controlling the hitch units.

Referring first to FIG. 1 of the drawings, a pair of identical tractors are shown, one at 10 and one at 11. The tractors face away from each other and support opposite ends of a hauling component shown at 12. A kingpin connects the opposite ends of the hauling unit 12 with the tractors 10 and 11 and such kingpins are illustrated at 14 and 15. Each of the tractors 10 and 11 is a complete unit with an operator's cab and controls for both units so that an operator sitting in the cab of either unit can drive the vehicle in one direction or from the cab of the other unit, can drive it in the opposite direction. It is to the hitches 14 and 15 that the present invention is directed and these hitches not only permit swiveling or steering movement of the tractors with respect to the body 12 but provide a liquid weight sustaining bearing and means for elevating the body as, for example, to the broken line position shown in FIG. 1. This is sometimes necessary when the vehicle is traveling over rough terrain or is dumping material from bottom dump doors (not shown) in a windrow.

FIGS. 2 and 3 illustrate the general construction of the hitch unit, FIG. 2 being somewhat shorter in proportion than the actual unit. A kingpin or piston shown at 18 in FIGS. 2 and 3 is provided with a flange 19 by means of which it is secured by bolts to a tractor unit in the position shown in FIG. 1 which will be observed as substantially centrally positioned with respect to the two axles of the tractor. A cylinder 20 embraces the piston 18 and carries a seal assembly 21 adjacent to its lower end and a guiding seal ring assembly 22 is provided adjacent the upper end of the piston. These seals retain the piston and cylinder in axial alignment while preventing telescoping adjustment limited in upward movement of the cylinder by contact with the seal structure 22 of a stop member 24 in the form of an annulus supported on a tubular support 25 between the walls of the piston and the cylinder. Downward movement of the cylinder is limited by a stop 26 also engaging with the seal assembly 22. One-half of the cylinder 20 fits within a box-like structure generally indicated at 28 in FIG. 3 and is secured in place as by capscrews 30 which extend through brackets 32 welded to opposite sides of the cylinder. The capscrews are threaded into the outermost edges of the structure 28. Beams 34 and 35 support the structure with respect to the ends of the unit 12.

Since the construction so far described imposes the weight of the hauling component and its contents on the capscrews in a manner to subject them to shearing force, an arcuate load sustaining element 38 is welded to the exterior of the cylinder 20 and is provided with an arcuate groove 40 extending throughout its length and receiving a mating tongue 41 shown as secured to the lower portion of the box-like structure 28 and also firmly secured into mating relationship with the groove by means of bolts best shown at 42 in FIG. 4. Thus the capscrews 30 are relieved of a major portion of the shear load to which they would otherwise be subjected. A pair of lever arms shown at 44 in FIGS. 2 and 3 form connections for steering linkage which acts between the tractors and hauling component but does not form a part of the present invention.

The manner in which the hitches of the present invention support the load of the hauling unit and its contents and the manner in which the hauling unit may be raised and lowered may best be understood by reference to FIG. 5 wherein the two hitches are mechanically illustrated together with the connecting hydraulic circuits and controls. Each tractor has its own source of hydrauulic fluid under pressure and directs fluid from said source through line 50 to an accumulator by means of a line 51, the accumulator being disposed within the piston 18 and being of a construction which is not material to an understanding of the present invention. The source also communicates up through a line 52 to a valve generally indicated at 53 which controls flow of pressure to the space between the piston and the cylinder. Fluid is also admitted to the space beneath the guide ring 22 by one or more passages extending through said ring, one of which is indicated in dotted lines at 54 in FIG. 2.

The pressure of oil within the cylinder 20 required to maintain the hauling unit, either loaded or unloaded, in a slightly raised position so that the weight thereof will be borne by the liquid rather than by contact between metal components is somewhat less than the pressure available from the source. For example, under load conditions 860 p.s.i. will sustain the cylinders in the slightly raised position illustrated in FIG. 5 while the pressure at the source is in the order of 2000 pounds. The valve 53 normally serves to maintain the cylinders in this condition and has a spool 55 slidable in a bore in the valve body and having a stem 56 extending into the cylinder in a position for engagement with the top of the piston. The pressure in the cylinder is communicated through a bore 57 to the upper end of the spool. If the cylinder moves downwardly under load or, when the tractors are shut down and pressure leaks from the system as through a drain line 58, the stem of the valve spool engages the upper end of the piston 18 and is moved upwardly to cause a port 60 to register with the supply line 52 and admit fluid under pressure to raise the cylinder to the position shown. As the cylinder attains this position the port 60 no longer communicates with the line 52 and the high pressure fluid is cut off from communication with the interior of the cylinder. Thus regardless of fluctuations of weight of the hauling unit the cylinder is maintained at a proper height and an oil bearing is insured.

Under some conditions it is desirable to elevate the hauling unit with respect to the ground and the tractors and this can be accomplished by directing additional fluid from the high pressure source into the cylinder 20. To accomplish this a valve 64 is provided in the cab of each tractor and controls flow of fluid from the high pressure line 50 through a shuttle valve 65 and a line 66 with branches 67 leading to each of the valves 53. With either of the valves 64 open, the shuttle valve directs liquid from the high pressure source on the tractor with the open valve to both of the valves 53 and communicates with chambers 68 beneath flanges at the upper ends of the spools 55. This high pressure overcomes the pressure above the spool raising the spool upwardly to communicate passage 60 therein with high pressure line 52 for directing an additional quantity of high pressure fluid into the cylinder until it is raised to the position where its stop 24 (see FIG. 2) engages the ring 22. This, in practice in one large vehicle, amounts to an elevation of about 30 inches, so a considerable ground clearance has been obtained. The cylinders may be lowered by movement of the valves 64 to the position illustrated in FIG. 5 wherein the chambers 68 in the valves 53 are communicated to either one of two drain lines shown at 70.

We claim:

1. In a truck having a body and tractor unit, a kingpin connecting said units, said kingpin comprising a vertically disposed piston on the tractor unit, a cylinder secured to the body and slidably embracing the piston a body of noncompressible hydraulic fluid substantially filling the cylinder above the piston to provide a fluid bearing to sustain weight of the truck body, means to automatically replenish fluid lost from said body of fluid, said means comprising a valve communicating between the fluid body and a source of fluid under pressure, and means to open the valve actuated upon downward movement of the cylinder relative to the piston.

2. The combination of claim 1 in which the valve is a spool valve disposed on top of the cylinder and has a spool with an end extending into the cylinder in a position to be engaged and moved to a valve open position by the piston upon downward movement of the cylinder.

References Cited

UNITED STATES PATENTS

| | | | |
|---|---|---|---|
| 235,297 | 12/1880 | Roberts et al. | 308—9 |
| 2,422,813 | 6/1947 | Walch | 37—126 |
| 2,450,204 | 9/1948 | Pridy | 254—87 X |
| 2,614,864 | 10/1952 | Bean | 280—404 X |
| 2,772,892 | 12/1956 | Hake et al. | 280—408 X |
| 2,788,145 | 4/1957 | Clark | 280—423 X |
| 2,988,375 | 6/1961 | Lich | 280—124 |
| 3,014,739 | 12/1961 | Kress | 280—489 |
| 3,104,679 | 9/1963 | Gouirand. | |
| 3,151,884 | 10/1964 | Felburn | 280—408 X |

FOREIGN PATENTS

| | | |
|---|---|---|
| 217,855 | 2/1957 | Australia. |

LEO FRIAGLIA, *Primary Examiner.*